No. 890,869. PATENTED JUNE 16, 1908.
R. S. PEASE.
METHOD OF DRAWING GLASS.
APPLICATION FILED SEPT. 8, 1904. RENEWED OCT. 9, 1907.
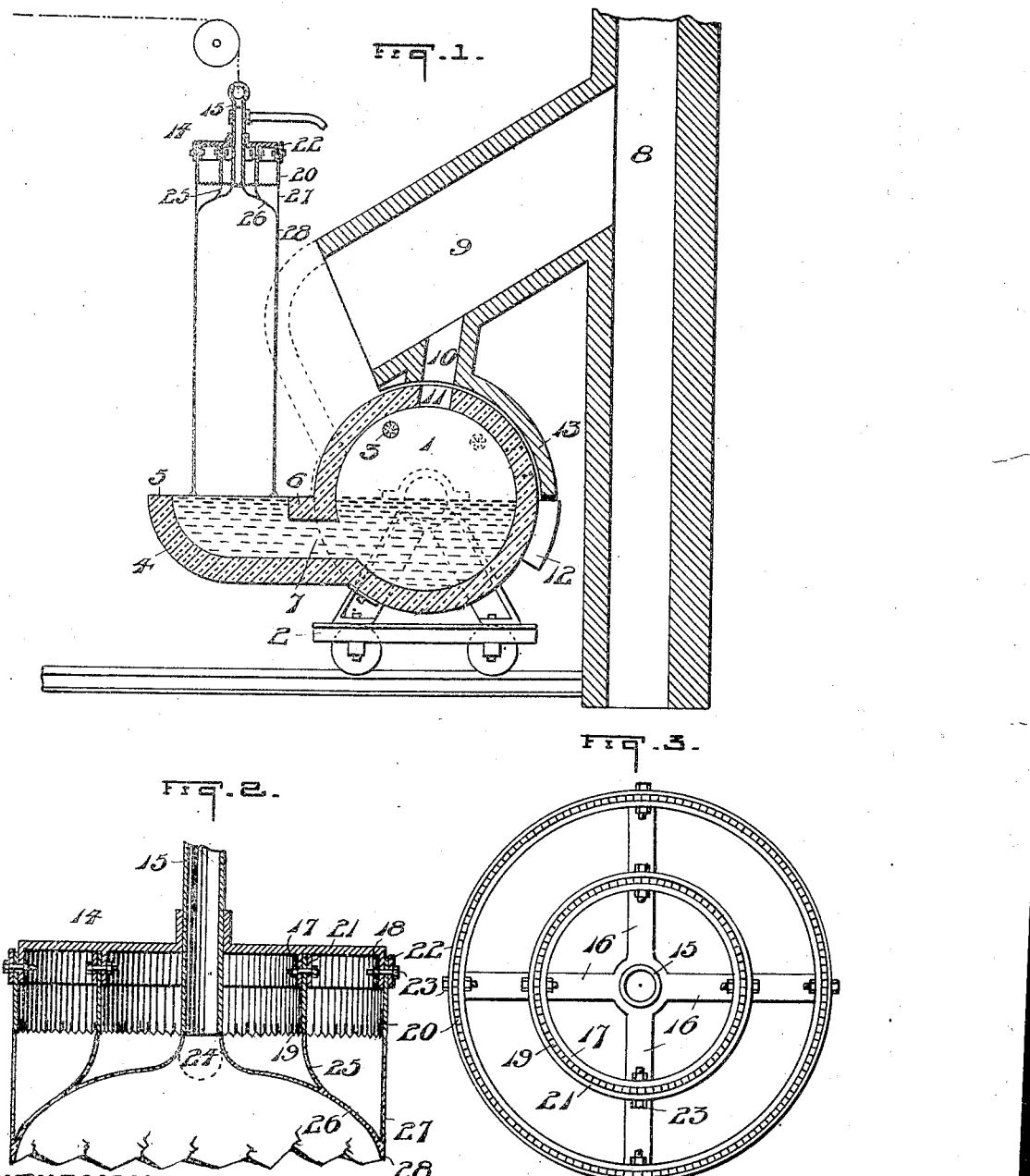
WITNESSES:
INVENTOR
R.S.Pease
By
Wm L. Pierce
his ATTORNEY

UNITED STATES PATENT OFFICE.

ROGER S. PEASE, OF ALLEGHENY, PENNSYLVANIA, ASSIGNOR TO ALFRED M. LEE, TRUSTEE, OF PITTSBURG PENNSYLVANIA.

METHOD OF DRAWING GLASS.

No. 890,869.   Specification of Letters Patent.   Patented June 16, 1908.

Application filed September 8, 1904, Serial No. 223,712. Renewed October 9, 1907. Serial No. 396,662.

*To all whom it may concern:*

Be it known that I, ROGER S. PEASE, a citizen of the United States, residing at Allegheny, in the county of Allegheny and State of Pennsylvania, have invented or discovered new and useful Improvements in Methods of Drawing Glass, of which the following is a specification.

My invention relates to methods of drawing glass from a molten bath, and its object is to reinforce the glass as it is stretched from a preliminary bubble or gather into the desired diameter of the cylinder or article to be drawn.

Referring to the drawings which form a part of this specification, Figure 1 is a vertical section of one form of apparatus by which my improved method may be practiced; Fig. 2, an enlarged vertical section of the bait shown in Fig. 1; and Fig. 3 is a bottom plan thereof.

Referring now to Fig. 1, 1 represents a cylindrical pot mounted axially on the car 2. 3 represents a gas burner situated at the upper part of the interior of the pot by which the glass is melted during the drawing operation and the trough portion of the pot reheated after the drawing operation. Connected to one side of the pot is the trough 4 having the outer lip 5 and the inner lip 6 between which lies the surface of the glass from which the drawing is made. The upper surface of these lips lies slightly above the upper wall or lip of the passage 7 which conveys the melted glass from the cylindrical portion of the pot into the trough. The glass should be of a sufficient depth in the trough to keep the drawing surface at the proper temperature. 8 represents a chimney having a lateral flue 9 extending over the pot. The lower end of this flue 9 is open and is adapted to register with the mouth of the trough 4 when the pot is rotated into the position shown by the dotted lines, in which position the passage 7 and the trough furnish a path for the escape of the products of combustion from the burner 3, the burner serving at the same time to reheat the trough and melt out any glass adhering thereto. The flue 9 is provided with a branch flue 10, which registers with the passage 11 in the upper side of the pot 1 in its normal or drawing position. During the drawing operation the products of combustion from the burner 3 escape through the passage 11 and the flues 9 and 10 into the chimney 8. 12 designates a stop-lug secured to the pot 1, the lug engaging with the lower side of the wall 13 when the pot has been rotated down into the position for drawing glass as shown.

Referring now to all the figures on the drawing, 14 designates the drawing tool or bait by which the glass is raised from the pot and made into cylindrical form. The bait is provided with a central vertical tube 15 which forms a portion thereof, and by which the other portions are supported. To the tube 15 are secured the arms 16 provided on their under side with flanges 17 and 18, concentric with the tube. Sleeved upon these flanges 17 and 18 are the skirts 19 and 20 which are clamped between the flanges and the bands 21 and 22 by means of the bolts 23.

The lower ends of the tube 15 and the skirts 19 and 20 are in substantially the same horizontal plane. The skirts may be provided with notched lower edges in order to present separated points for the attachment of the glass, or may be straight across like the lower end of tube 15, as preferred. Although I have shown the skirts notched, they may be of any suitable construction which will present a series of separated points to the glass and I do not limit myself to the continuous band in the construction of the skirts, as they may be made wholly of separated parts serially arranged or of one or more parts presenting the required attaching points of the glass. I do not limit the word skirt to any usual use or idea of the term, but desire to include any endless series of points or separated surfaces for the attachment of the glass, whether these points or surfaces are wholly distinct or separated from each other, or secured to or integral with a common support. The tube 15 would preferably be composed of a composition whose coefficient of expansion is the same as that of the glass in order to prevent the glass cracking around it during its cooling.

Supposing the pot to be filled with glass at the level shown in Fig. 1, the bait is lowered into the glass and the latter allowed to become attached thereto in the usual manner. The bait is then raised and air blown in through the tube 15. At the beginning of this operation the blowing will form a small bubble as indicated by the dotted line 24. If it were now required to make a cylinder from this preliminary bubble, it is clear that the glass of which the bubble is composed must be stretched and therefore its wall thinned in order to obtain the required diameter of the cylinder. Where the cylinder is of considerable diameter the shoulder where the cylinder begins is necessarily very thin and in practically all cases the cylinder will be thinner at this point than it is desired to have it. It is an impossibility to increase the thickness of the cylinder wall after the cylinder proper has been started. My improved bait overcomes this objectionable thinning of the cylinder wall in the following manner:—After the preliminary bubble 24 has been expanded so as to become materially thinned it comes in contact with the depending skirt of glass 25 attached to the bait skirt 19, the original bubble wall and the skirt 25 merging into a reinforced or thickened skirt or wall 26. As the blowing is continued the reinforced skirt 26 becomes stretched and thinned and finally comes into contact with the skirt of glass 27 hanging to the skirt 20, the two skirts 26 and 27 forming a new reinforced skirt 28 which I have shown to be the starting place of the cylinder proper. The tube 15 may be regarded also as a skirt.

I have shown the air admitted through the bait, but I do not limit myself to this construction since it is immaterial to the broad idea of my invention whether the air is introduced through the bait or through the glass in the pot after the manner well known in the art.

When the drawing has been completed the cylinder is cut off from any glass remaining in the pot and the pot rotated to the position shown in the dotted lines in Fig. 1. The burner 3 which has been keeping the glass hot during the drawing operation and sending its gases through the passage 11 and the flues 9 and 10 now finds its exit through the passage 7 and the trough 4 into the flue 9, whereby the glass sticking in the trough is remelted and the trough reheated due to the circulation of the gas through it, the pot being kept hot ready for another supply of glass. When the pot has become sufficiently heated and prepared for the reception of another supply of glass it is rotated to the position shown in full lines in Fig. 1 and recharged with molten glass, another cylinder being drawn in the manner described.

It will be seen that my invention is not limited to the drawing of cylinders as sheets or other forms may also be drawn from the pot.

I do not limit myself to the precise details of construction and practice above described but desire to include within my invention all modifications which come within the scope thereof.

By the words "preliminary body" in the claims, I do not confine myself to the bubble as described, but would regard my invention and claims as covering the merging of the two skirts 26 and 27 by the air pressure without having the tube 15 touch the glass. In this instance the skirt 26 would be the preliminary body.

Having described my invention, I claim:—

1. The method of forming bodies from a molten bath, which consists in forming a preliminary body and an inclosing body from the bath, expanding the preliminary body, and merging it with the inclosing body.

2. The method of forming bodies from a molten bath, which consists in forming a preliminary body and a plurality of inclosing bodies from the bath, expanding the preliminary body, and merging it successively with the inclosing bodies.

Signed at Pittsburg, this sixth day of Sept., 1904.

ROGER S. PEASE.

Witnesses:
ALICE E. DUFF,
F. N. BARBER.